United States Patent
Bracmard et al.

(10) Patent No.: US 8,816,778 B2
(45) Date of Patent: Aug. 26, 2014

(54) CLOCK FREQUENCY ADJUSTING METHOD AND CIRCUIT

(75) Inventors: Gaetan Bracmard, Saint Savournin (FR); Jean-Pascal Maraninchi, Marseilles (FR); Julien Roche, Arles (FR)

(73) Assignee: INSIDE Secure, Aix-en-Provence, Cedex 3 (FR)

( * ) Notice: Subject to any disclaimer, the term of this patent is extended or adjusted under 35 U.S.C. 154(b) by 0 days.

(21) Appl. No.: 13/552,704

(22) Filed: Jul. 19, 2012

(65) Prior Publication Data

US 2013/0021106 A1    Jan. 24, 2013

(30) Foreign Application Priority Data

Jul. 21, 2011  (FR) ...................... 11 56639

(51) Int. Cl.
*H03L 7/00* (2006.01)
*H03K 3/03* (2006.01)

(52) U.S. Cl.
USPC ............... 331/2; 331/44; 331/48; 331/57

(58) Field of Classification Search
USPC .............. 331/2, 44, 46–49, 55–57, 172
See application file for complete search history.

(56) References Cited

U.S. PATENT DOCUMENTS

| 4,494,079 | A  | * | 1/1985  | Light et al. ................. 331/1 A |
|---|---|---|---|---|
| 5,398,007 | A  | * | 3/1995  | Yamazaki et al. ........... 331/46 |
| 5,525,936 | A  | * | 6/1996  | Post et al. .................. 331/47 |
| 5,815,043 | A  |   | 9/1998  | Chow et al. |
| 6,204,694 | B1 |   | 3/2001  | Sunter et al. |
| 6,563,387 | B2 | * | 5/2003  | Hirano et al. ............... 331/11 |
| 7,103,337 | B2 | * | 9/2006  | Uozumi et al. ............. 455/255 |
| 7,154,348 | B2 | * | 12/2006 | Lee et al. .................... 331/34 |
| 7,292,119 | B2 | * | 11/2007 | Urakawa ................... 331/179 |
| 7,541,878 | B2 | * | 6/2009  | Haiut ........................... 331/2 |
| 7,548,124 | B2 | * | 6/2009  | Chae et al. .................. 331/44 |
| 7,750,747 | B2 | * | 7/2010  | Marutani ................... 331/179 |
| 7,800,457 | B2 | * | 9/2010  | Unkrich et al. ............ 331/158 |
| 7,890,787 | B2 | * | 2/2011  | Bradley et al. ............. 713/500 |
| 8,509,372 | B1 | * | 8/2013  | Zhang et al. ............... 375/376 |

* cited by examiner

*Primary Examiner* — Levi Gannon
(74) *Attorney, Agent, or Firm* — Panitch Schwarze Belisario & Nadel LLP

(57) ABSTRACT

A method for adjusting an oscillator clock frequency, comprising: providing a first oscillator, applying a first setpoint value to the first oscillator, determining a first oscillator frequency value within a first time frame, providing a second oscillator, applying a second setpoint value to the second oscillator, determining a second oscillator frequency value within a second time frame, determining a new frequency setpoint value from the first and second frequency values, the first and second setpoint values, and a desired frequency value, and applying the new frequency setpoint value to one of the first and second oscillators.

13 Claims, 2 Drawing Sheets

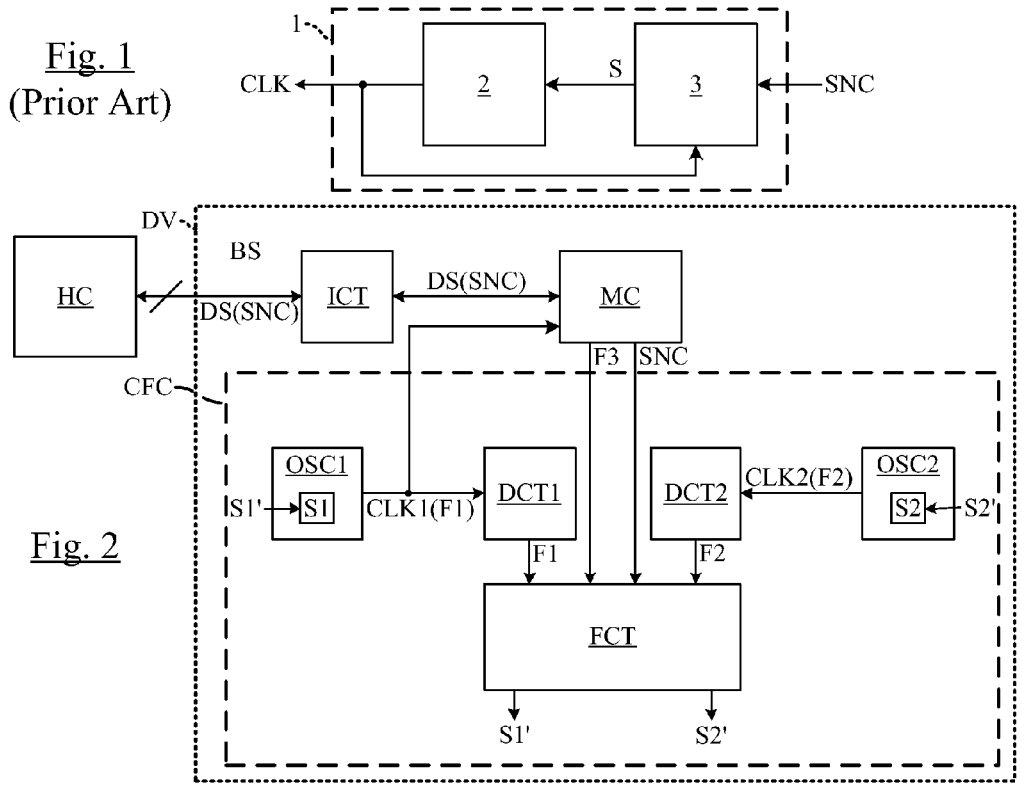
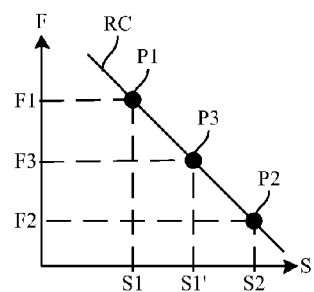
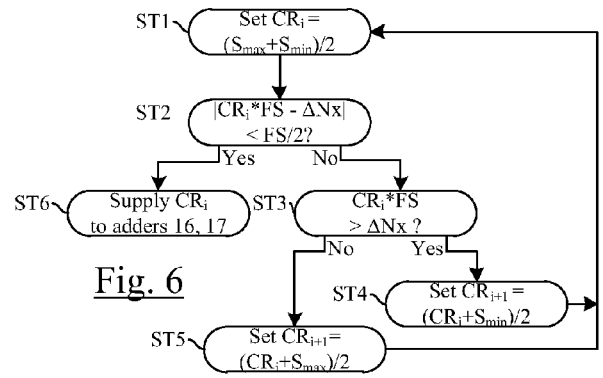
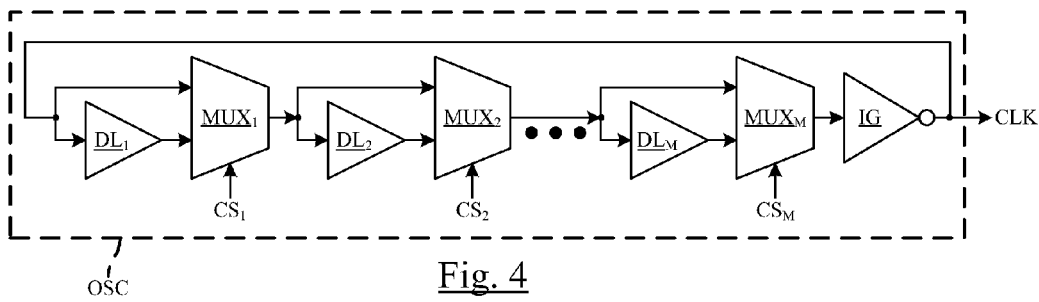

CLOCK FREQUENCY ADJUSTING METHOD AND CIRCUIT

BACKGROUND OF THE INVENTION

Embodiments of the present invention relate to a method for adjusting a clock frequency of an oscillator and to an oscillator clock frequency adjusting circuit. In particular, embodiments of the invention relate to a method for automatically adjusting the clock frequency of a Universal Serial Bus (USB) device and to a USB device including such a clock frequency adjusting circuit.

Universal Serial Bus relies on a technical specification detailing communications between a host controller (such as a personal computer) and a device, such as a keyboard, mouse, digital camera, external memory, or the like via an interface called a USB port. The USB Specification 2.0 defines different data transfer rates, including a low-speed mode at 1.5 Mb/sec with an accuracy margin of ±1.5%.

As the host controller does not send a clock signal to the device, the device must generate its own clock signal with sufficient precision to meet the required USB data transfer rate. A quartz crystal oscillator may be provided, but this solution is unsuitable for low-cost applications and occupies too much area. An alternative is to base the generation of clock cycles on a synchronization signal sent by the host, such as a Start of Frame or a "Keep Alive" signal sent in the absence of traffic to keep the device from entering a suspended state. In these cases, a time frame between two consecutive synchronization signals is 1 ms. For a USB device operating with a clock frequency of 6000 KHz, an accuracy margin of +1.5% provides for a frequency margin of +90 KHz, resulting in between 5910 and 6090 clock cycles per 1 ms time frame.

FIG. 1 shows a clock frequency adjusting circuit 1 including an oscillator 2 and a calibration unit 3. The oscillator 2 generates a clock signal CLK which is fed back to the calibration unit 3. When the calibration unit 3 receives a first instance of a synchronization signal SNC, it begins counting the number of cycles of the clock signal CLK on its input until the next instance of the synchronization signal, when it stops counting. The calibration unit 3 determines the difference between the counted number of cycles and the desired number of cycles, then supplies a control signal S to the oscillator 3, which increases or decreases its frequency accordingly.

At this point, the "frequency step" of the oscillator, the change in frequency on output of oscillator 2 due to the application of the control signal S, is unknown. This is because the operation of the oscillator may vary over time, such as due to an increase in temperature, altering the operation of the oscillator. Thus, the desired frequency will typically be under- or over-shot after the first adjustment phase.

The number of clock cycles is therefore again counted during the next time frame to determine the frequency step of the oscillator. The calibration unit 3 again supplies control signal S to the oscillator 3 to obtain the desired frequency after the second time frame.

It may therefore be desired to provide a circuit able to adjust the frequency of an oscillator after a single time frame.

BRIEF SUMMARY OF THE INVENTION

Embodiments of the invention relate to a method for adjusting an oscillator clock frequency, including providing a first oscillator, applying a first setpoint value to the first oscillator, and determining a first oscillator frequency value within a first time frame. The method further includes the steps of providing a second oscillator, applying a second setpoint value to the second oscillator, determining a second oscillator frequency value within a second time frame, determining a new frequency setpoint value from the first and second frequency values, the first and second setpoint values, and a desired frequency value, and applying the new frequency setpoint value to one of the oscillators.

According to one embodiment, the method further includes counting the number of clock cycles of the first oscillator within the first time frame to determine the first frequency value, and counting the number of clock cycles of the second oscillator within the second time frame to determine the second frequency value.

According to one embodiment, the first and second time frames are the same time frame.

According to one embodiment, the step of determining the new setpoint value further includes determining a first difference between the first and second frequency values, determining a second difference, between the first and second setpoint values, dividing the first difference by the second difference to obtain a frequency step, determining a third difference, between the first or second frequency value and the desired frequency value, dividing the third difference by the frequency step to obtain a correction value, and adding the correction value to the first setpoint value to obtain the new setpoint value.

According to one embodiment, the step of determining the new setpoint value further includes determining a first difference between the first and second frequency values, multiplying the first setpoint value by a difference between the desired frequency value and the second frequency value to obtain a first product, multiplying the second setpoint value by a difference between the desired frequency value and the first frequency value to obtain a second product, adding the first and second products to obtain a first sum, and dividing the first sum by the first difference to obtain the new setpoint value.

According to one embodiment, the step of determining an oscillator frequency value of an oscillator further includes receiving a synchronization signal, and counting a number of clock cycles of the oscillator between two consecutive instances of the synchronization signal.

According to one embodiment, the method further includes a step of adjusting the frequency of the second oscillator to maintain a difference in frequency with respect to the first oscillator.

According to one embodiment, the method further includes a step of selecting the second frequency setpoint so that the difference between the first and second setpoints is a power of two.

According to one embodiment, the method is used to adjust the clock frequency of a USB device receiving a synchronization signal by way of a communication interface.

Embodiments of the invention also relate to a clock frequency adjusting circuit including a first oscillator for generating a first clock signal with respect to a first frequency setpoint value.

The circuit further includes a second oscillator for generating a second clock signal with respect to a second frequency setpoint value, and is configured to apply a first setpoint value to the first oscillator and a second setpoint value to the second oscillator, determine a first oscillator frequency value within a first time frame, and a second oscillator frequency value within a second time frame, determine a new frequency setpoint value from the first and second frequency values, the first and second setpoint values, and a desired frequency value, and apply the new frequency setpoint value to one of the oscillators.

According to one embodiment, the circuit includes two counters receiving each one of the clock signals, and supplying a count number value representative of the number of clock cycles counted within the first or second time frame.

According to one embodiment, the circuit is configured to determine the first oscillator frequency value and the second oscillator frequency value within the same time frame.

According to one embodiment, the first and second oscillators include ring oscillators, each including delay circuits, multiplexors, and a least one inverter.

According to one embodiment, the circuit further includes registers for storing the setpoints.

According to one embodiment, the circuit is configured to receive external synchronization signals delimiting the time frames.

According to one embodiment, the circuit is configured to use, as the synchronization signal, a keep alive signal according to the USB 2.0 specification.

Embodiments of the invention also relate to a USB 2.0 device including an interface circuit for receiving a data signal including a synchronization signal, a microcontroller, and a clock frequency adjusting circuit according to the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Embodiments of the present invention will now be described in connection with, but not limited to, the appended drawings in which:

In the drawings:

Figure 7:
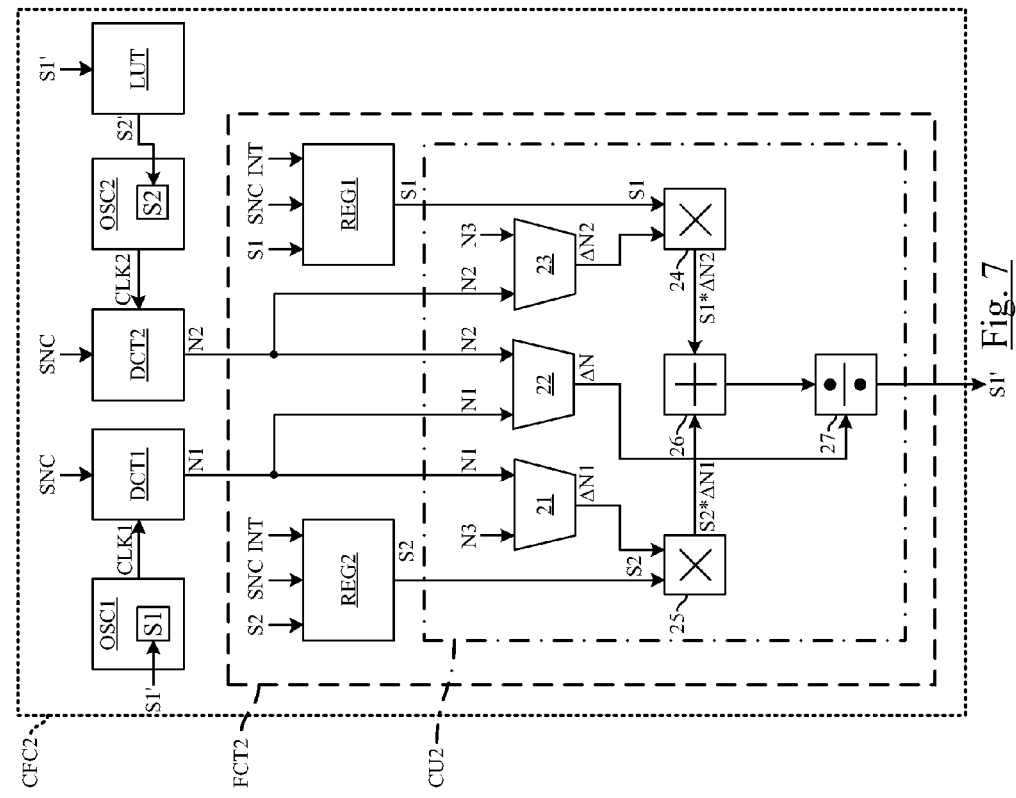
Figure 5:
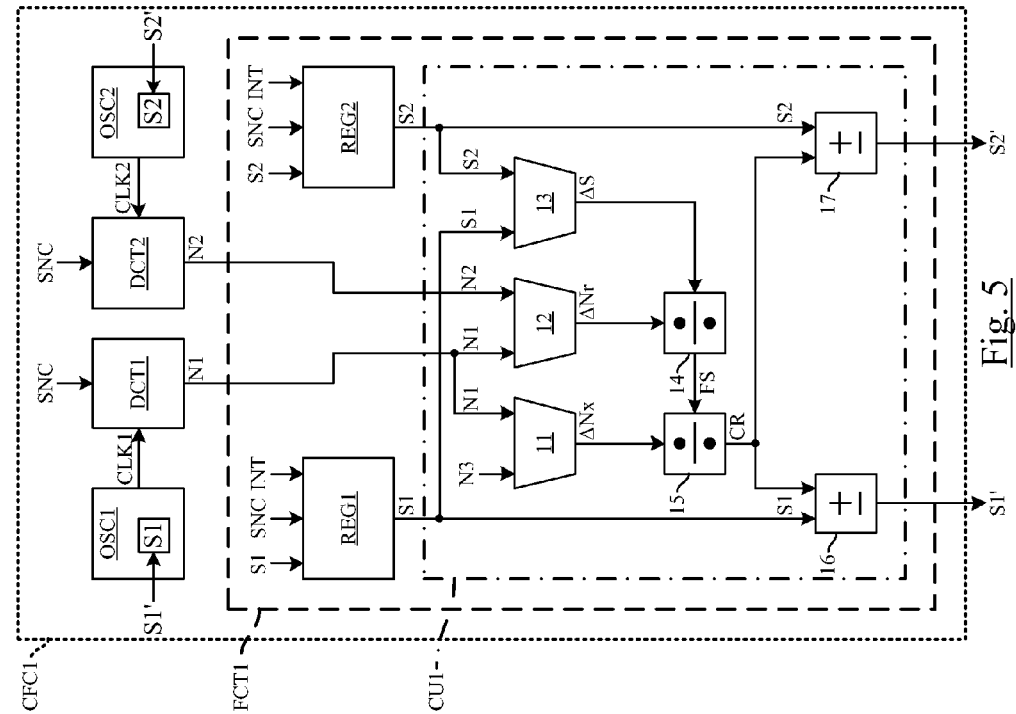

FIG. 1 previously described, shows a conventional clock frequency adjusting circuit;

FIG. 2 is a block diagram of a device including an oscillator clock frequency adjusting circuit according to an embodiment of the invention;

FIG. 3 is a graph of the relation between oscillator frequency value and oscillator setpoint value for the frequency adjusting circuit of FIG. 2;

FIG. 4 is a circuit diagram of an oscillator present in the frequency adjusting circuit of FIG. 2;

FIG. 5 is a circuit diagram of an embodiment of the frequency adjusting circuit of FIG. 2;

FIG. 6 is a flow chart of a method of determining a frequency correction value according to the embodiment of FIG. 5; and FIG. 7 is a circuit diagram of another embodiment of the frequency adjusting circuit of FIG. 2.

DETAILED DESCRIPTION OF THE INVENTION

FIG. 2 shows a device DV including a communication interface ICT, a microcontroller MC, and a clock frequency adjusting circuit CFC according to an embodiment of the invention. The device DV is linked to a host controller HC via the interface circuit ICT by way of a bus BS. The microcontroller MC is linked to the interface circuit ICT and to the circuit CFC by way of wires.

The circuit CFC includes an oscillator OSC1, an oscillator OSC2, an oscillator frequency determining circuit DCT1, an oscillator frequency determining circuit DCT2, and a frequency calculation circuit FCT. Oscillators OSC1, OSC2 are each set with a frequency "setpoint value" S1, S2 respectively. The setpoint value corresponds to a frequency adjustment (delay) that may be applied to the oscillator to adjust its frequency, higher or lower, on output.

A data signal DS is sent and received from the host controller HC and the device DV by way of the bus BS. A synchronization signal SNC, such as a keep alive signal or a start of frame signal according to the USB Specification 2.0, is included within the data signal and transferred to the microcontroller MC via the interface circuit ICT. The microcontroller MC then transfers the signal SNC to the circuit CFC.

The synchronization signal SNC defines time frames, a time frame being the amount of time between two consecutive instances or pulses of the signal SNC. The microcontroller MC also supplies, to the frequency calculation circuit FCT, a desired frequency value F3 corresponding to a clock signal frequency required for its data transfer needs, such as 6000 KHz.

During a first time frame $\Delta t_i$, oscillator OSC1 operates with a setpoint value S1, and generates a clock signal CLK1 with a frequency value F1. Clock signal CLK1(F1) is supplied to the microcontroller MC for its needs and to the circuit DCT1. Determining circuit DCT1 determines the frequency of the clock signal on its input and supplies on output the frequency F1 to the circuit FCT. Oscillator OSC2 operates with a setpoint value S2, and generates a clock signal CLK2 with a frequency value F2. Clock signal CLK2(F2) is supplied to the circuit DCT2. Determining circuit DCT2 determines the frequency of the clock signal on its input and supplies on output the frequency F2 to the circuit FCT.

The frequency calculation circuit FCT then calculates a new setpoint value S1' from the frequency values F1, F2, the setpoint values S1, S2, and the desired frequency value F3. The new setpoint value S1' is applied to oscillator OSC1 during a next time frame $\Delta t_{i+t}$ to obtain the desired frequency F3 on output of the oscillator OSC1. Optionally, a new setpoint value S2' may be similarly determined and applied to oscillator OSC2.

FIG. 3 is a graph showing the relation between the frequency values F and the setpoint values S of the oscillators OSC1, OSC2 during a time frame $\Delta t_i$. A point P1 corresponds to the frequency F1 of oscillator OSC1 and its setpoint S1. A point P2 corresponds to the frequency F2 of oscillator OSC2 and its setpoint S2. A response curve RC is extrapolated between points P1, P2. A point P3 corresponds to the desired frequency F3 of oscillator OSC1 and the new setpoint S1' to be applied to oscillator OSC1 during the next time frame $\Delta t_{i+t}$ to obtain said desired frequency. In this embodiment, the oscillators OSC1, OSC2 are shown as having frequencies F1, F2 and setpoints S1, S2 respectively greater than and less than the desired frequency F3 and setpoint S1'. It will be understood that in other embodiments the frequencies F1, F2 and setpoints S1, S2 may be both greater than or both less than frequency F3, setpoint S1'.

Therefore, setpoint S1' may be determined using the values F1, S1, F2, S2, F3 by exploiting the relations between points P1, P2, P3. For example, it is well known that to find the slope m of a line defined by two points p1(x1, y1) and p2(x2, y2), the following general equation may be used:

$$m=(y1-y2)/(x1-x2)$$

wherein m is the slope and x1, x2, y1, y2 are the coordinates of the two points p1, p2.

The clock frequency adjusting circuit CFC, and more particularly the frequency calculation circuit FCT shown above in FIG. 2, calculates the new frequency setpoint S1' to obtain the desired frequency F3 by implementing the equations shown below. Specifically, the new setpoint S1' may be calculated using the following equations and the first and second frequency values F1, F2, the first and second setpoint values S1, S2, and the desired frequency value F3.

The slope m of response curve RC using points P1, P2, P3 is equal to:

$$m=(F1-F3)/(S1-S1')=(F3-F2)/(S1'-S2)=(F1-F2)/(S1-S2) \quad [\text{eq. 1}]$$

Using the first term of equation 1 only, the slope m is equal to:

$$m=(F1-F3)/(S1-S1') \quad [\text{eq. 2}]$$

Solving for S1':

$$S1'=S1+(F1-F3)/m \quad [\text{eq. 3}]$$

The term (F1−F3)/m is a "correction" CR that is added to S1. This correction CR may be a negative value, depending upon whether points P1, P2 are less than or greater than point P3. In such a case, the setpoint S1 of oscillator OSC1 is decreased rather than increased to obtain the new setpoint S1'.

Since F1, F2, S1, S2 are known values, the slope m of response curve RC may be directly calculated using the last term of equation 1 as follows:

$$m=(F1-F2)/(S1-S2) \quad [\text{eq. 4}]$$

As a result, the new setpoint value S1' may be calculated by substituting equation 4 into equation 3 as follows:

$$S1'=S1+(F1-F3)/[(F1-F2)/(S1-S2)] \quad [\text{eq. 5}]$$

FIG. 4 is a circuit diagram of an oscillator OSC, representative of each oscillator OSC1, OSC2 according to an embodiment of the invention. The oscillator OSC is a ring oscillator including one inverting gate IG, M delay circuits $DL_1$ to $DL_M$, and M multiplexor circuits $MUX_1$ to $MUX_M$, for a total M of delay-multiplexor pairs DL-MUX. The maximum number M of delay-multiplexer pairs may be from several to a hundred or more, depending upon the amount of precision required, the space available for the oscillator, etc.

Each multiplexor $MUX_1$ to $MUX_M$ has one input receiving a signal from its corresponding delay circuit $DL_1$ to $DL_M$, and one input receiving a signal that bypassed the delay circuit. Each multiplexor is controlled by the setpoint, for example a control signal $CS_0$, $CS_1$, ... $CS_M$ obtained from a decoding (not shown in FIG. 4) of the setpoint value. The inverting gate IG is located after the last multiplexer $MUX_M$ and supplies the oscillating clock signal CLK, which is also fed back to the first delay-multiplexor pair $DL_1$-$MUX_1$.

By way of example, for an oscillator including a total of M=32 delay-multiplexor pairs, a setpoint value S=10 will cause ten of the multiplexors to select the input from its corresponding delay circuit, decreasing the frequency on output of the oscillator by ten times the delay of the delay circuit DL. If it is necessary later to increase the oscillator frequency, the setpoint may be lowered, for example S=8 to de-select two of the delay circuits, increasing the frequency on output by twice the delay value. Thus, depending upon the setpoint value of the oscillator, a corresponding number of multiplexors select the delayed input. A frequency step FS is defined as the result on the output of the oscillator of the difference in number of clock cycles N due to an adjustment of a single setpoint value (selecting or de-selecting one delay circuit DL of the oscillator). It is to be understood that the higher the setpoint value, the more multiplexors are activated to select the delayed inputs, the greater the delay, and thus the lower the clock cycle count and the lower the clock frequency.

During a design phase of the oscillators, the delay of each delay circuit is calculated, and the number of delay cells is chosen so that the target frequency may be reached in all working conditions—best case scenario, typical scenario, and worst case scenario. The number of delay-multiplexor circuits that can be selected by the control signals from among the total M delay-multiplexor pairs available for an oscillator ranges from a minimum number $S_{min}$ to a maximum number $S_{max}$. In general, the minimum number $S_{min}$ will be equal to zero and the maximum number $S_{max}$ will be equal to the total number M of delay-multiplexor pairs, but depending upon the design and fabrication of the oscillator, these values may be otherwise. For example, it may be found that in order for the oscillator to be able to reach the target frequency, at least five delay circuits must always be selected, in which case $S_{min}$=5.

Preferably, the selection of delay circuits results in a corresponding linear change of the frequency on output of the oscillator. Furthermore, the oscillators OSC1, OSC2 are preferably designed to be as identical as possible, for the highest precision possible in calculating the new setpoint value(s).

FIG. 5 is a circuit diagram of a clock frequency adjusting circuit CFC1 according to one embodiment of the invention. The circuit CFC1 includes the oscillators OSC1, OSC2, the frequency determining circuits DCT1, DCT2, and a frequency calculation circuit FCT1.

During a first time frame $\Delta t_i$, oscillator OSC1 operates with a setpoint value S1, and generates a clock signal CLK1 with a frequency value F1. Clock signal CLK1(F1) is supplied to the microcontroller MC for its needs (not shown) and to the circuit DCT1. Determining circuit DCT1 is, in this embodiment, a counter receiving on input the synchronization signal SNC and the clock signal CLK1. Upon receiving a first instance of the synchronization signal SNC, circuit DCT1 begins counting the number of clock cycles of the clock signal CLK1 on its input. Upon receiving a second instance of the synchronization signal SNC, circuit DCT1 stops counting the number of clock cycles and then supplies on output a clock cycle count value N1 to the frequency calculation circuit FCT1.

Likewise, oscillator OSC2 operates with setpoint value S2, and generates a clock signal CLK2 with a frequency value F2. Clock signal CLK2(F2) is supplied to the circuit DCT2, which also receives on input the synchronization signal SNC and counts the number of clock cycles of clock signal CLK2 during two instances of the synchronization signal. Determining circuit DCT2 supplies on output a clock cycle count value N2 to the frequency calculation circuit FCT1.

The circuit FCT1 includes a register REG1, a register REG2, and a calculation unit CU1. Registers REG1, REG2 each receive on input the current setpoint value of oscillator OSC1, OSC2 (here setpoints S1, S2), the synchronization signal SNC, and an initialization signal INT supplied by the microcontroller MC for example. Initially, for the first usage of the device, the register REG1, REG2 is loaded with a setpoint value determined for example by the microcontroller, and the oscillator OSC1, OSC2 is also set with this setpoint value. Then, upon receiving an instance of the synchronization signal SNC, the register REG1, REG2 is loaded with the current setpoint value S1, S2 of the oscillator OSC1, OSC2 and supplies on output value S1, S2 to the calculation unit CU1.

The calculation unit CU1 includes a comparator 11, a comparator 12, a comparator 13, a divider 14, a divider 15, an adder 16, and an adder 17. Comparator 11 receives on one input the count value N1 from circuit DCT1 and on another input the desired count value N3 from the microcontroller MC (not shown in FIG. 5). Comparator 11 compares the two values, and determines which is greater. That is to say, whether the frequency F1 of the oscillator OSC1 must be increased or decreased to reach the desired frequency F3. Depending on this comparison, comparator 11 performs N3−N1 or N1−N3, and supplies on output a difference ΔNx, representing a difference between the actual count value N1 of the oscillator OSC1 and the desired count value N3 of the oscillator OSC1.

Comparator 12 receives on one input the count value N1 from circuit DCT1 and on another input the count value N2 from circuit DCT2. Comparator 12 performs N2−N1 or N1−N2, depending on which oscillator OSC1, OSC2 has a higher count value, and supplies on output a difference ΔNr, representing the difference in count values N1, N2 of the oscillators OSC1, OSC2.

Comparator 13 receives on one input the setpoint value S1 from register REG1, and on another input the setpoint value S2 from register REG2. Depending on which oscillator has the higher setpoint, comparator 13 performs S2−S1 or S1−S2, and supplies on output a setpoint difference ΔS, representing the difference in setpoint values S1, S2 of the oscillators OSC1, OSC2.

Divider 14 receives on one input the difference ΔNr from comparator 12, and on another input the difference ΔS from comparator 13. Divider 14 performs a division of the first input by the second input ΔNr/ΔS, to find the slope m, as shown in equation 4 above. The slope corresponds to the frequency step FS between the two oscillators OSC1, OSC2.

Divider 15 receives on one input the difference ΔNx from comparator 11, and on another input the frequency step FS from divider 14. Divider 15 performs a division of the first input by the second input, ΔNx/FS to find the correction CR according to equation 3 above.

Adder 16 receives on one input the correction CR from divider 15, and on another input the setpoint S1 from register REG1. Adder 16 then adds or subtracts as needed the correction CR from the setpoint S1, in accordance with equation 3. Adder 16 then supplies the new setpoint S1' to oscillator OSC1, which adjusts its frequency accordingly to obtain the desired count N3. The new setpoint S1' is also loaded in register REG1 (not shown in FIG. 5), replacing the previous setpoint S1.

Adder 17 receives on one input the correction CR from divider 15, and on another input the setpoint S2 from register REG2. Adder 17 adds or subtracts as needed the correction CR from the setpoint S2, then supplies the new setpoint S2' to oscillator OSC2, which adjusts its frequency accordingly. The new setpoint S2' is also loaded in register REG2 (not shown in FIG. 5), replacing the previous setpoint S2.

It is preferable but not necessary to modify the setpoint S2 of oscillator OSC2 every time the setpoint S1 of oscillator OSC1 is modified to maintain a difference in setpoints and thus frequencies on output of each oscillator. Furthermore, it is preferable to not set the setpoint values of each oscillator equal to the same value. Otherwise, if the setpoint difference ΔS=0, a correction cannot be calculated (division by zero) by divider 14 even if the clock cycle counts N differ in a given time frame.

In one embodiment, the difference ΔS between S1 and S2 is chosen to always be a power of 2. This simplifies the division by divider 14 to find the frequency step FS, as dividing a number by two consists of a 1-bit shift to the right of the result, with the lowest bit being either dropped or shifted to the decimal positions. This embodiment allows for a low cost, one cycle divider. For example, if S1 is set to 0, then S2 may be set to 2, 4, 8, 16, 32, or the like to obtain a difference ΔS=|S1−S2|=$2^x$. Thus, after the application of a correction CR to oscillator OSC1, oscillator OSC2 may also be adjusted to maintain a difference of a power of two $2^x$ with oscillator OSC1. Preferably, a maximum difference ΔS is maintained between the setpoint values S1, S2 for better accuracy.

Numerical Examples

As a first example, it is supposed that during the time frame $\Delta t_i$, N1=6500, S1=16, N2=5500, S2=24, and N3=6000. The calculation unit CU1 calculates ΔNx=500, ΔNr=1000, and ΔS=8. The frequency step FS=1000/8=125, and the correction CR=500/125=4. The new setpoint S1' is equal to 16+4=20 to increase the delay of oscillator OSC1 to obtain the desired count of N3=6000, which corresponds to the frequency F3 of 6000 KHz. Oscillator OSC2 may be increased by the same correction for a setpoint value S2'=28 to maintain a frequency difference ΔS between the two oscillators OSC1, OSC2.

During the next time frame $\Delta t_{i+1}$, N1=6000, S1=20, N2=5100, S2=28, and N3=6000. As the difference ΔNx between the oscillator OSC1 count N1 and the desired oscillator OSC1 count N3 is equal to 0, the frequency of oscillator OSC1 does not need to be adjusted and the adjustment of the oscillator frequency has been achieved after a single time frame.

If at some time frame $\Delta t_{++}$ later the frequencies of oscillators OSC1, OSC2 begin to drift, for example due to an increase in temperature during operation, the difference between the count N1 of oscillator OSC1 and the expected count N3 will no longer be zero, and the frequency adjustment can again be performed.

It will also be understood that a non-whole number may be calculated for setpoint S1'. In this case, the setpoint S1' applied to the oscillator OSC1 may be rounded up or down to the nearest whole number, as it is not possible to add or subtract a fraction of a delay circuit DL. The actual count on output of the oscillator will not be exactly equal to the desired count, but will most likely be within the acceptable accuracy range of the oscillator.

As an example to illustrate this last point, it is supposed that N1=6100, S1=20, N2=6600, S2=4, and N3=6000. The calculation unit CU1 calculates ΔNx=100, ΔNr=500, and ΔS=16. The frequency step FS=500/16=31.25, and the correction CR=100/31.25=3.2, which is rounded down to 3. The new setpoint S1' is set to 23 to decrease the frequency of oscillator OSC1 to obtain a count of approximately 6006, which is within the accuracy range of 5910 and 6090 for a data transfer of accuracy of ±1.5% of the desired frequency, as required by the USB Specification 2.0.

FIG. 6 is a flowchart of a method of calculating the correction CR according to one embodiment. The method shown in FIG. 6 includes steps ST1 to ST6 using divider 15 of FIG. 5 in the case where the frequency step FS is a non-whole number. In this embodiment, a simple shift divider like that of divider 14 is not used. A dichotomous divider is used instead, requiring several cycles but being low in cost.

In step ST1, the correction $CR_i$ is set to $(S_{max}+S_{min})/2$. In step ST2, an absolute difference between the product of the correction and the frequency step $CR_i*FS$ and the difference ΔNx between N1 and N3 is compared with the frequency step FS divided by two. If the absolute difference is less than half the frequency step FS, then the correction is adequate for the frequency adjustment, and the method of calculating the correction is completed. The correction $CR_i$ is supplied to adders 16, 17.

Otherwise, if the response at step ST2 is no, then in step ST3, it is determined whether the product $CR_i*FS$ is greater than the difference $\Delta Nx$. If the response is yes, then the correction needs to be decreased, and the method goes to step ST4. Otherwise, if the response at step ST3 is no, then the correction needs to be increased, and the method goes to step ST5.

In step ST4, the correction is decreased by setting a new correction $CR_{i+1}$ equal to the sum of correction $CR_i$, $S_{min}$, divided by two. The process returns to step ST2, where the new correction value $CR_{i+1}$ is used. Otherwise, in step ST5, the correction is increased by setting a new correction $CR_{i+1}$ equal to the sum of correction $CR_i$, $S_{max}$, divided by two. The process returns to step ST2.

As an example, if $S_{min}=0$, $S_{max}=32$, FS=60, and $\Delta Nx=500$, then $CR_1=16$, and the calculation at step ST2 yields |16*60−500|=460, greater than 60/2=30. The result of the calculation at step ST13 is that the correction must be decreased. At step ST15, the new correction $CR_2=(16+0)/2=8$. The method returns to step ST2, where the calculation |8*60−500|=20, less than 30. The correction of 8 is therefore added to or subtracted from the setpoint S1 and setpoint S2.

It will be understood by the skilled person that the method of adjusting the frequency of an oscillator clock frequency may be performed in other ways using frequencies F1, F2, setpoint values S1, S2, and the desired frequency value F3.

If equation 1 is again considered, cross-multiplication of the two first terms yields:

$$(F1-F3)*(S1'-S2)=(F3-F2)*(S1-S1') \quad [eq.\ 6]$$

After multiplying the two binomials on each side, regrouping the S1' terms on one side, and factoring out the S terms one obtains the result:

$$S1'=[S1*(F3-F2)+S2*(F1-F3)]/(F1F2) \quad [eq.\ 7]$$

FIG. 7 is a circuit diagram of a clock frequency adjusting circuit CFC2 according to another embodiment of the invention, implementing the calculation according to equation 7. The circuit CFC2 includes oscillators OSC1, OSC2, frequency determining circuits DCT1, DCT2, a lookup table LUT, and a frequency calculation circuit FCT2. The frequency calculation circuit FCT2 includes the registers REG1, REG2, and a calculation unit CU2.

The oscillators OSC1, OSC2, circuits DCT1, DCT2, and registers REG1, REG2 have the same inputs and outputs as described above in relation with FIG. 5, and will not be described again.

The calculation unit CU2 includes a comparator 21, a comparator 22, a comparator 23, a multiplier 24, a multiplier 25, an adder 26, and a divider 27.

Comparator 21 receives on one input the count value N1 from circuit DCT1, and on another input the desired count value N3 from the microcontroller MC (not shown in FIG. 7). Comparator 21 compares the two values, and determines which is greater. Depending on this comparison, comparator 21 performs N3−N1 or N1−N3, and supplies a difference $\Delta N1$ on output, representing a required oscillator count difference between count value N1 of the oscillator OSC1 and the desired count value N3 of the oscillator OSC1.

Comparator 22 receives on one input the count value N1 from circuit DCT1, and on another input the count value N2 from circuit DCT2. Depending on which oscillator has a higher frequency, comparator 22 performs N2−N1 or N1−N2, and supplies on output a difference $\Delta N$, representing an actual oscillator count difference.

Comparator 23 receives on one input the count value N2 from circuit DCT2, and on another input the desired count value N3. Comparator 23 compares the two values, and performs N3−N2 or N2−N3, and supplies on output a difference $\Delta N2$, representing a required oscillator count difference between count value N2 of the oscillator OSC2 and the desired count value N3 of the oscillator OSC1.

Multiplier 24 receives on one input the difference $\Delta N2$ from comparator 23, and on another input the setpoint value S1 from register REG1. Multiplier 24 multiplies these two values, and provides the product $S1*\Delta N2$ on output. Similarly, multiplier 25 receives on one input the difference $\Delta N1$ from comparator 21, and on another input the setpoint value S2 from register REG2. Multiplier 25 multiplies these two values, and provides the product $S2*\Delta N1$ on output.

Adder 26 receives on one input the product $S1*\Delta N2$ from multiplier 24, and on another input the product $S2*\Delta N1$ from multiplier 25. Adder 26 adds these two products, and supplies the sum $S1*\Delta N2+S2*\Delta N1$ on output. Finally, divider 27 receives on one input the sum $S1*\Delta N2+S2*\Delta N1$ from adder 26, and on another input the difference $\Delta N$ from comparator 22. It divides the first input by the second, and supplies the result, the new setpoint value S1', to oscillator OSC1 and to register REG1. Oscillator OSC1 modifies its frequency accordingly, and register REG1 replaces setpoint S1 with new setpoint S1' (not shown in FIG. 7).

The lookup table LUT receives on input the new setpoint value S1' and supplies on output a corresponding new setpoint value S2', which is supplied to oscillator OSC2 and to register REG2 (not shown in FIG. 7).

As a final numerical example illustrating the second embodiment of the invention, the same values as the first numerical example are used to illustrate that the same results may be obtained in various other ways. It is thus again supposed that N1=6500, S1=16, N2=5500, S2=24, and N3=6000. The calculation unit CU2 calculates $\Delta N1=500$, $\Delta N=1000$, and $\Delta N2=500$. The term $S1*\Delta N2=8000$ $S2*\Delta N1=12000$, the sum of the two terms is 20000, and new setpoint S1' is equal to 20000/1000=20, which is the same result as achieved above. The new setpoint S1' is provided to the lookup table LUT, which supplies a new setpoint 52'=28 on output to the oscillator OSC2 and to the register REG2 (not shown in FIG. 7).

It will be understood by the skilled person that the invention is susceptible of various other embodiments. In particular, alternate embodiments of an oscillator may be supplied. For example, instead of a ring oscillator including M delay circuits and only one inverter, each oscillator may include a plurality of inverters that are selected or de-selected accordingly.

Furthermore, it will be understood by the skilled person that the oscillators OSC1, OSC2 are not necessarily ring oscillators, but may be any type of oscillator whose frequency may be adjusted in regular frequency steps, and that the oscillator frequency determining circuits DCT1, DCT2 may be any means of determining the frequency of an oscillator other than by counting the number of clock cycles. The registers REG1, REG2 are not necessarily a part of the frequency calculation unit FCT, and may be located external to this circuit. The new frequency setpoint value S1' may be calculated with respect to the second setpoint value S2, but for optimum accuracy, it is preferred to calculate S1' with respect to setpoint value S1. The method of adjusting the frequency of the oscillator may also include a step of comparing the count value N1 with a first and/or second threshold value, such as 5910 and 6090 in the examples provided above. If the count value N1 is less than or greater than the threshold values, then the adjusting method may be performed, otherwise, the method is not performed until the count value N1 is outside the permissible threshold value(s).

Furthermore, it will be understood that in the preceding description, the desired frequency value of 6000 KHz was given as an example only, and that any other desired frequency value maybe used. Finally, the terms "frequency" F and "count" N may be generally interchanged in the equations and drawings.

Though the invention was initially conceived in relation with the technical problem set forth in the preamble, the skilled person will understand that embodiments of the invention may be provided that do not solve this technical problem. Particularly, embodiments may be provided in which the determination of the frequency of the second oscillator is done during a time interval other than the time interval for the determination of the frequency of the first oscillator, for example two consecutive time intervals.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for adjusting an oscillator clock frequency to a desired frequency using first and second oscillators responsive to first and second setpoints, the method comprising:
    configuring the first and second oscillators to have a same frequency-setpoint response curve,
    applying a first setpoint value to the first oscillator,
    measuring a first frequency value of the first osciallator,
    applying a second setpoint value, different from the first setpoint value, to the second oscillator,
    measuring a second frequency value of the second oscillator,
    determining the response curve of the oscillators from the first and second frequency values and the first and second setpoint values,
    extrapolating a new frequency setpoint value from the response curve and a desired frequency parameter, and
    applying the new frequency setpoint value to one of the first and second oscillators.

2. The method according to claim 1, wherein the step of extrapolating the new setpoint value further comprises:
    determining a first difference between the first and second frequency values,
    determining a second difference between the first and second setpoint values,
    dividing the first difference by the second difference to obtain a frequency step,
    determining a third difference between the first or second frequency value and the desired frequency parameter,
    dividing the third difference by the frequency step to obtain a correction value, and
    adding the correction value to the first setpoint value to obtain the new setpoint value.

3. The method according to claim 1, wherein the step of extrapolating the new setpoint value further comprises:
    determining a first difference between the first and second frequency values,
    multiplying the first setpoint value by a difference between the desired frequency parameter and the second frequency value to obtain a first product,
    multiplying the second setpoint value by a difference between the desired frequency parameter and the first frequency value to obtain a second product,
    adding the first and second products to obtain a first sum, and
    dividing the first sum by the first difference to obtain the new setpoint value.

4. The method according to claim 1, wherein the step of measuring a frequency value of an oscillator further comprises:
    counting a number of clock cycles of the oscillator between two consecutive instances of a same synchronization signal.

5. The method according to claim 4, to adjust the clock frequency of a USB device receiving the synchronization signal by way of a communication interface.

6. The method according to claim 1, further comprising adjusting the frequency of the second oscillator to maintain a difference in frequency with respect to the first oscillator.

7. The method according to claim 6, wherein the setpoint values are binary numbers, the method further comprising selecting the second frequency setpoint so that the difference between the first and second setpoints is a power of two.

8. A circuit for adjusting an oscillator to a desired frequency, the circuit comprising
    a first oscillator controllable by a first frequency setpoint input,
    a second oscillator of a similar structure to the first oscillator, controllable by a second frequency setpoint input,
    the circuit being configured to:
    apply a first setpoint value to the first oscillator and a second setpoint value different from the first setpoint value to the second oscillator,
    measure a first frequency value of the first oscillator and a second frequency value of the second oscillator,
    extrapolate a new frequency setpoint value for the desired frequency from the first and second frequency values, the first and second setpoint values, and a desired frequency parameter, and
    apply the new frequency setpoint value to one of the oscillators.

9. The circuit according to claim 8, further comprising two counters respectively receiving the first and second oscillator outputs, and supplying as an oscillator frequency value a count number value representative of the number of oscillator cycles counted within a period of a same synchronization signal.

10. The circuit according to claim 9, configured to use, as the synchronization signal, a keep alive signal sent by a USB device.

11. The circuit according to claim 8, wherein the first and second oscillators comprise ring oscillators, each comprising a number of delay circuits, selectable by the corresponding setpoint value.

12. The circuit according to claim 8, further comprising registers for storing the setpoints.

13. A USB 2.0 device comprising:
    an interface circuit (ICT) for receiving a data signal (DS) comprising a synchronization signal,
    a microcontroller, and
    a circuit according to claim 8.

* * * * *